United States Patent [19]

Denton

[11] 3,806,253
[45] Apr. 23, 1974

[54] SWEEP MEASURING SCHEME
[75] Inventor: Eric B. Denton, Seattle, Wash.
[73] Assignee: Weyerhaeuser Company, Tacoma, Wash.
[22] Filed: Dec. 13, 1972
[21] Appl. No.: 314,850

[52] U.S. Cl............. 356/157, 144/209 A, 144/312, 250/219 TH, 356/160
[51] Int. Cl.... B27b 1/00, G01b 11/10, G01b 11/24
[58] Field of Search...... 250/219 TH, 209; 144/312, 144/209 R, 209 A, 209 B, 209 C; 350/138, 139, 146, 157, 156, 163, 167

[56] References Cited
UNITED STATES PATENTS

| 3,140,872 | 7/1964 | Bolger, Jr. | 250/209 |
| 3,459,246 | 8/1969 | Ottosson | 144/312 |
| 3,513,321 | 5/1970 | Sherman | 250/219 TH |
| 3,519,045 | 7/1970 | Blickenderfer et al. | 144/312 |
| 3,529,169 | 9/1970 | Heaney | 356/157 |
| 3,554,249 | 1/1971 | Arnelo et al. | 144/312 |
| 3,648,743 | 3/1972 | Fino et al. | 144/312 |

FOREIGN PATENTS OR APPLICATIONS
1,809,990  7/1969  Germany ........................... 356/157

Primary Examiner—Ronald L. Wibert
Assistant Examiner—Steven K. Morrison
Attorney, Agent, or Firm—Christensen, O'Connor, Garrison & Havelka

[57] ABSTRACT

A system for measuring the sweep of an object, particularly logs, where sweep may be defined as the spatial deviation of the actual center line of the log from an imaginary line drawn as if the log had been perfectly true. The system utilizes two light sensitive detectors, placed at a distance from the log and spaced apart at a substantial angle. Each sensor obtains information concerning the cross-section of the log relative to the sensor's location. Known methods of triangulation, utilizing the information obtained from the two sensors, are then used to determine the center point of the log at a first location of the log. Successive determinations are then made of the log at predetermined intervals, and the results compared with those of first location to determine the sweep at the successive log locations.

13 Claims, 8 Drawing Figures

Fig. 8

SWEEP MEASURING SCHEME

BACKGROUND OF THE INVENTION

This invention relates broadly to the object measuring art, and more specifically to that art concerned with determining the sweep of a log along its longitudinal axis.

Until the recent past, timbering operations in the United States have utilized the virgin timber growth which once covered a substantial portion of the land. The log stems obtained from these virgin forests were primarily large in diameter and were longitudinally true and even-grained. For the most part, the trees were not substantially curved or of irregular vertical shapes. Furthermore, any deviation from the vertical, which was likely to be very slight, was largely inconsequential, due to the large diameters of the logs. Thus, a sweep of three inches, i.e., a deviation of three inches from a perfectly straight vertical growth, was not likely to cause much percentage loss when the log was cut into lumber, because of the great overall size of the log in question.

The actual deviation from perfectly straight vertical growth in a log stem became known as "sweep" and was considered an undesirable, although in most cases inconsequential, feature of a particular log stem. The sweep of a log is shown more clearly in FIG. 1. Sweep may be defined generally as the distortion in the longitudinal or vertical growth of a log, or more precisely as the distance from a straight line reference, which is parallel to the longitudinal axis of the log and touches the log at a minimum of one point along its outer surface, to the near outer surface of the log. Thus, referring to FIG. 1, at longitudinal point 11 on the log stem, the sweep is the physical distance 10 between the straight line reference 12 and the near outer surface point 13. At any selected longitudinal position, the sweep of the log can thus be determined, relative to the straight line reference parallel to the longitudinal axis of the log.

With this definition of sweep in mind, the problems of obtaining a maximum yield of lumber from currently available log stems becomes clear. With the decline and eventual disappearance of virgin timber growth available for lumbering operations, second growth timber of a high yield nature must be relied upon to supply the increasing lumber demands. This secondary growth, which is often in the form of managed forests, cannot be allowed to mature as long as the original timber growth, from a standpoint of economy of yield. Therefore, the harvesting of the trees often will occur at a point in the growth of the trees where the size of the log stems is considerably less than that of virgin timber, where the log has a grain which is significantly less even than that of virgin timber, and where the timber is significantly more irregular than virgin timber. Thus, the secondary growth timber, which will constitute nearly all of the harvested timber in the near future, has considerably more sweep than virgin timber, and since the secondary growth log stems are considerably smaller, on the average, than virgin timber, the sweep also will have considerably more effect on the amount and kind of lumber obtainable from a given log stem.

Using virgin growth timber, the decision regarding the cutting of the log so as to optimize the yield could often be done by an experienced man controlling the sawing operation. However, with the introduction of secondary growth timber, with its significantly smaller size, and increased longitudinal distortion (sweep), the decision as to the actual cutting of the log so as to maximize yield or value becomes extremely complex and sophisticated, requiring consideration of many different variables. Furthermore, more decisions must be made during the same period to achieve the same rate of yield. Thus, even the experienced individual, in this age of secondary growth timber, is almost incapable of making satisfactory decisions regarding the cutting of a particular log, and needless waste of valuable timber is the result.

A system for automatically making the cutting decision is thus desirable so that the lumber yield from incoming logs may be absolutely maximized. To accomplish this, a method for quickly and automatically detecting certain physical characteristics of an incoming log is necessary. Information concerning the length of the log and the diameter of the log at various locations along the log is necessary. The prior art shows a method for adequately determining such dimensions. An example of such prior art is U.S. Pat. No. 3,513,321 to Sherman.

Besides the characteristics of diameter and length, however, a measurement of sweep, as defined above, at various locations along the log, is also necessary for an optimum decision regarding the cutting of a particular log stem. There is in the prior art no present teaching concerning a method or apparatus for accomplishing the automatic measurement or detection of the sweep of a log at various locations along its longitudinal axis. Therefore, it is an object of the present invention to provide a method whereby the sweep of a log may be accurately determined at various locations along its longitudinal axis.

It is a further object of this invention to optimize the yield from a particular log stem by making an accurate measurement of the sweep of the log.

It is another object of the invention to automatically determine the sweep of a log without the need for human intervention or judgment.

It is a further object of this invention to provide a method for determining the sweep of a log while the log is in the process of being prepared to be cut, thus minimizing the decision time necessary before the actual cut is to be made.

It is a still further object of the present invention to obtain an accurate true center line of a log with respect to its longitudinal axis.

SUMMARY OF THE INVENTION

Briefly, in accordance with a preferred form of the present invention, the invention includes positioning a plurality of sensors in a plane normal to the longitudinal axis of an object, such as a log stem. Information is then obtained concerning the physical configuration of the log in the specified plane by means of the sensors. Standard principles of triangulation are then utilized to determine the true center point of the log in the plane with respect to the log where the sensors are located. The determination of log center points at succeeding longitudinal locations results in an accurate determination of the actual center line of the log. This actual or real center line then may be compared at specified longitudinal positions with an imaginary center line or other true vertical reference line to determine accurately the sweep at the specified longitudinal position.

DESCRIPTION OF THE DRAWINGS

A more thorough understanding of the invention may be obtained by studies of the following detailed description taken in connection with the accompanying drawings in which:

FIG. 8 is a diagram illustrating measurements made in conjunction with a second embodiment of the present invention.

DESCRIPTION OF THE PREFERRED EMBODIMENT

Figure 1:
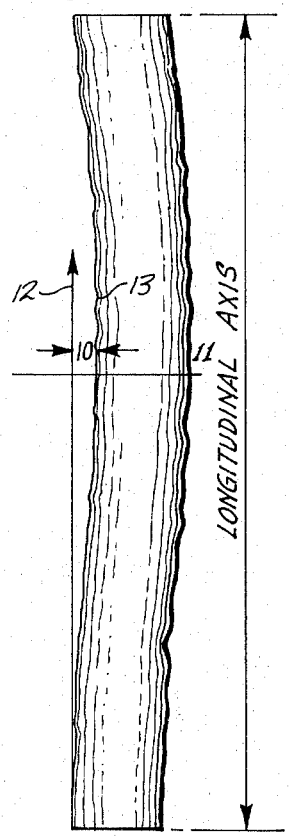
FIG. 1 is a diagram illustrating sweep in a log.
Figure 2:
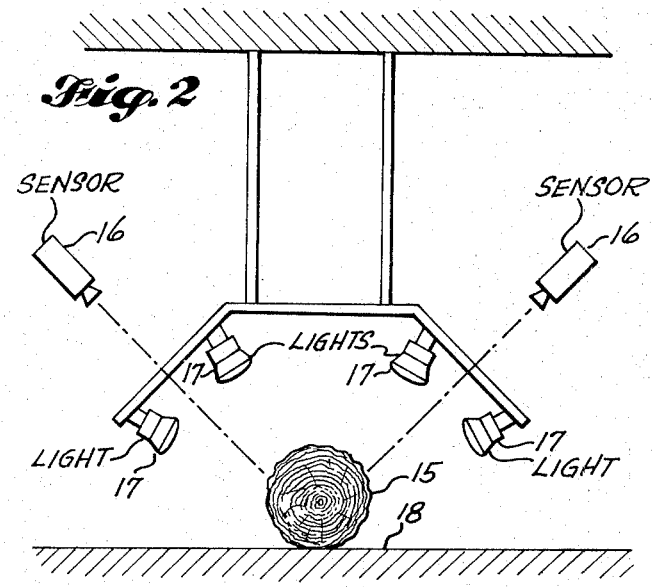
FIG. 2 is a simplified diagram of a first embodiment of the present invention.

FIG. 2 illustrates a first embodiment of the present invention in which a log 15 to be measured for sweep is shown approaching the sensors 16—16 in a longitudinal or end-wise direction. Various means may be utilized to "sense" the log in the longitudinal embodiment. FIG. 2 shows a bank of stationary scanner lights 17—17 which provide the illumination for the two sensors 16—16 shown. The log 15 is moved in this case longitudinally by a conveyor belt 18 through the scanner area, at a constant right angle relative to the sensor plane.

Although in this embodiment the sensors operate only at preselected intervals while the log is moving, it is possible to configure the elements so that the log remains stationary while the lights and the sensors move along the log, or to first move a log into a predetermined and fixed position, and then scan the log at one time, through a series of sensors and lights along the entire length of the log. Furthermore, more than two sensors may be used in this embodiment to improve the accuracy of the measurements.

When the log 15 is moved on the conveyor belt through the fixed sensor plane normal to the log, the sensors, in effect, take a "picture" of the log, thereby obtaining certain physical information concerning the log at the particular scanning point. As the log then moves longitudinally, the two sensors take successive scans or pictures at predetermined intervals along the length of the log, so as to get a complete dimensional representation of the log in question. The sensors are a standard, commercially available photo-diode array which measure precisely the outside dimensions and angles relative to a reference line of the object being scanned by focusing reflected light from the object.

Figure 3:
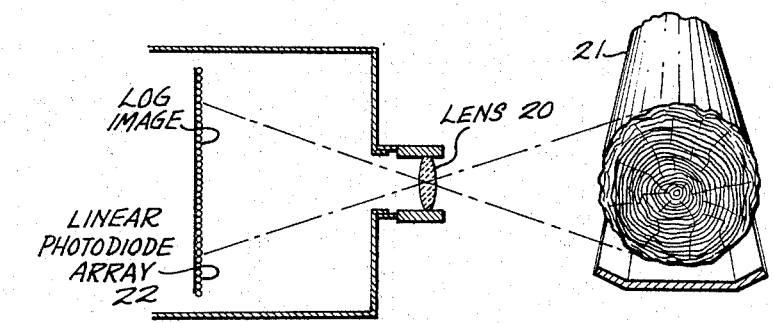
FIG. 3 is a simplified diagram of a typical sensor used in the first embodiment.

FIG. 3 shows the basic configuration of the sensor. The lens 20 focuses relfected light from the log 21 and displays it on the photo-diode array 22 which is arranged in a linear fashion in back of the focusing lens. The lens, the photo array and the log are so arranged that a log having a diameter of 36 inches will cause all the diodes in the array to light (128 individual photo-diodes in the first embodiment). Thus, any diameter log from zero to 36 inches may be accurately measured, by counting the number of diodes lit, and from this initial measurement, it is relatively easy to determine the actual angle sub-tended by a log of diameter from 0-36 inches relative to the lens, and the difference between the actual angle and the maximum angle (as if the log had a diameter of 36 inches) both of which are used in the first embodiment calculations.

Figure 4:
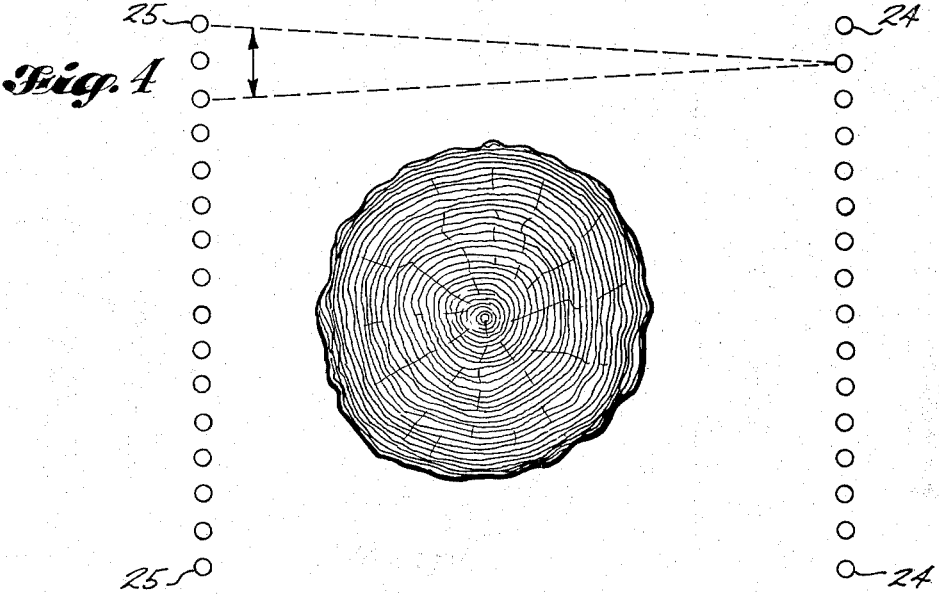
FIG. 4 is a diagram of another embodiment of the present invention.

In regard to the physical sensing of the dimensions of a log, it is of course not necessary to utilize the scheme described above; rather, many other systems of scanning may be utilized just as effectively. For instance, referring to FIG. 4, a system of back-lighting an object such as a log may be used to accurately determine diameter measurements. For instance, a log may be longitudinally moved past an array of light-emitting diodes 24—24 which might be, for instance, on half-inch centers, covering a total vertical dimension of 36 inches. Each one of the light emitting diodes might then be lit sequentially, the system at the same time interrogating a bank of light-sensitive photo-diodes 25—25 arranged on the other side of the log. The sequential interrogation of the photo-diodes would result, when properly calibrated, in an indication of the diameter of the log. Thus, the actual method of scanning an object to obtain the physical measurements is relatively unimportant, as any system which results in accurate measurements may be utilized.

The sensing of the physical measurements of a log is not sufficient, however, to determine the sweep of a log. As discussed above, the determination of sweep can be made by calculating the center point of the log at various points along the longitudinal axis of the log, and then comparing this point with an imaginary "true" center line. The present invention utilizes the physical measurements discussed above to calculate the actual center point at successive locations along the log, and then to derive the sweep of the log at those points.

To determine the sweep, the inventors have, as previously discussed, characterized sweep in terms of deviations of the actual center line of a log from an imaginary center line drawn as if the log were perfectly true or straight. At least two sensors are necessary to determine sweep, as shown pictorially in FIG. 2 and diagrammatically in FIG. 5. The sensors, relative to the log, should be separated by a significant angle to achieve uniform and accurate results. Thus, although a 90° separation is most desirable, a separation of 50° to 60° would still provide a fairly accurate indication of center point. An angle of 10° might still result in useful readings, although the accuracy of the resulting center point measurement would be impaired. This impairment occurs primarily because of the eccentricity of the log diameter, at the measuring point.

If a particular object is perfectly round, a small angular separation between the scanners would be sufficient to give an accurate reading of center point, assuming accurate sensor measurements. However, if the log is eccentric in any fashion, it is desirable to have a wider angular separation, and perhaps more than two scanners, so that the eccentricity will not distort the measurement of the true center point. If a log is exceptionally eccentric, with numerous irregular, circumferential patterns, a complex array of scanners completely encircling the log would be necessary in order to obtain an accurate indication of the true center point of the particular log.

Figure 5:
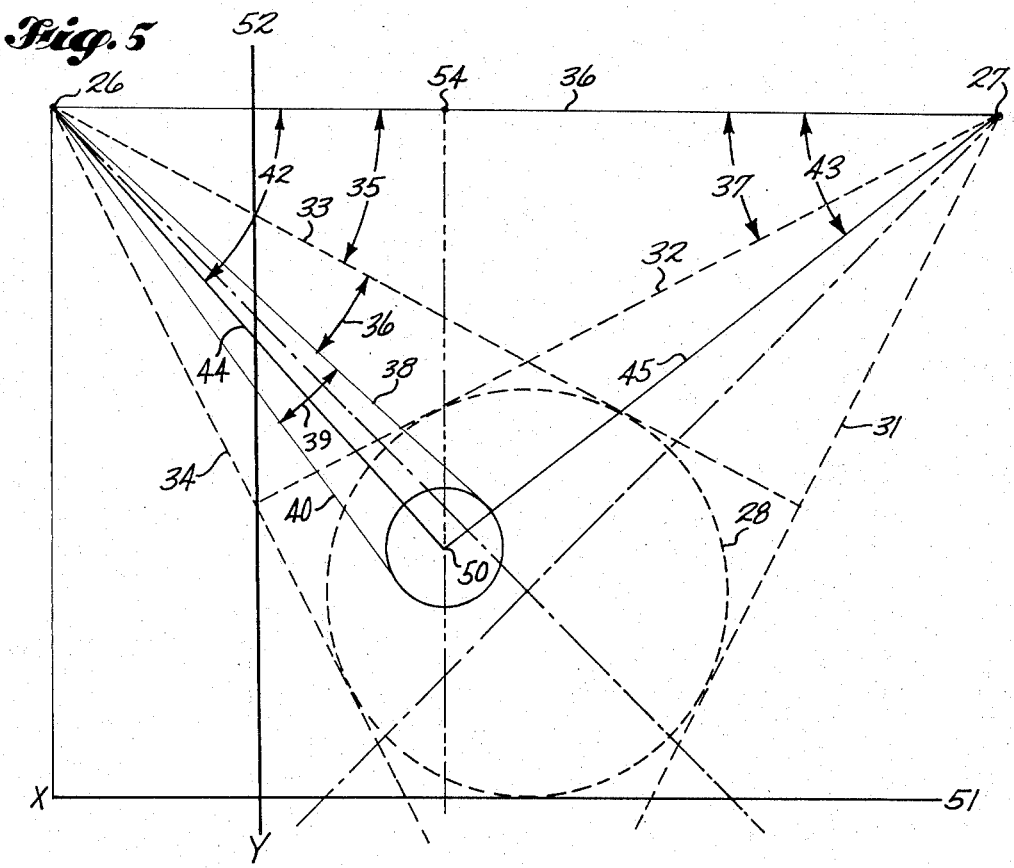
FIG. 5 is a diagram illustrating the measurements which are made in conjunction with a first embodiment of the present invention.

Given a perfectly round log, for purposes of illustration, and an optimum angular separation of 90° between two sensors, the true center point of a log at a particular longitudinal cross-section relative to the longitudinally moving logs may be obtained, as shown in FIG. 5 and described in the following paragraphs.

Referring to FIG. 5, the sensor 26 and the sensor 27 both have a predetermined maximum field of view, which refers to the maximum diameter log which the particular system is capable of handling. This maximum field of view is illustrated by the dotted circle 28, the diameter of which, relative to each sensor, is shown by dotted lines 31, 32, 33 and 34. Because the maximum log diameter or field of view, and the position of the sensors 26 and 27 are fixed and known, the angle 35, bounded by lines 33 and 36 (an imaginary line connecting the centers of the two sensors) and angle 37 are also fixed and known.

When a log is then moved longitudinally through the sensor plane, each sensor 26, 27 receives a physical "picture" of the log. Since each sensor in this embodiment has 128 elements, a total of 128 discrete angular measurements may be made within the field of view of the sensor (the maximum angle which may be measured). In conjunction with the sensor, which physically measures the angles, a computer look-up table is provided which associates the lit-unlit configuration of the diodes with an appropriate angular measurement in degrees. Thus, any subtended angle within the field of view of the sensor may be accurately measured, the boundaries of a particular angle being delineated by a change of state between adjacent diodes, i.e., lit to unlit, or unlit to lit.

Referring to FIG. 5, to determine the center point of a log in a selected plane, the invention first measures angle 36 which is the angle between edge-of-view line 33 and the near edge of the log being measured, depicted by line 38. This angle is obtained by counting the number of unlit diodes between the edge of the photodiode array and the first lit diode, which is lit due to reflected light from the outside edge, line 38, of the log. This angular measurement, that is, the angle from the edge-of-view to the first edge of the log, is made by both sensors 26 and 27. The number of unlit diodes is then referred to a look-up table, to obtain the angular measurement in degrees.

The second angle which is measured by the sensors is the actual angle subtended by the log being measured. This is the angle 39, bounded by the two outside edges of the log as seen by the individual sensors. In relation to sensor 26, it is the angle enclosed by lines 38 and 40. In order to determine this angle, it is necessary to count the number of lit diodes in the array and refer to a table for the appropriate angle.

A third angle is then calculated relative to the individual sensors, this third angle being used to determine an imaginary line going through the center point of the log relative to each sensor. With respect to sensor 26, angle 39 is divided in half and added to previously measured angle 36 and known angle 35. This is the angle bounded by the imaginary line 36 connecting the two individual sensors and the imaginary line 44 dividing angle 39 exactly in half. A similar angle 43 is determined with respect to sensor 27. A triangle of imaginary lines is thus created, lines 36, 44 and 45, lines 44 and 45 crossing each other at point 50, which is the actual center point of the log in the selected plane. This point may be located relative to arbitrarily chosen X axis 51 and Y axis 52 by known methods of triangulation, one method of which is described in the following paragraphs. To assist in the calculations, imaginary line 55 is drawn perpendicular from line 36 at point 54 to point 50.

Figures 6, 7:
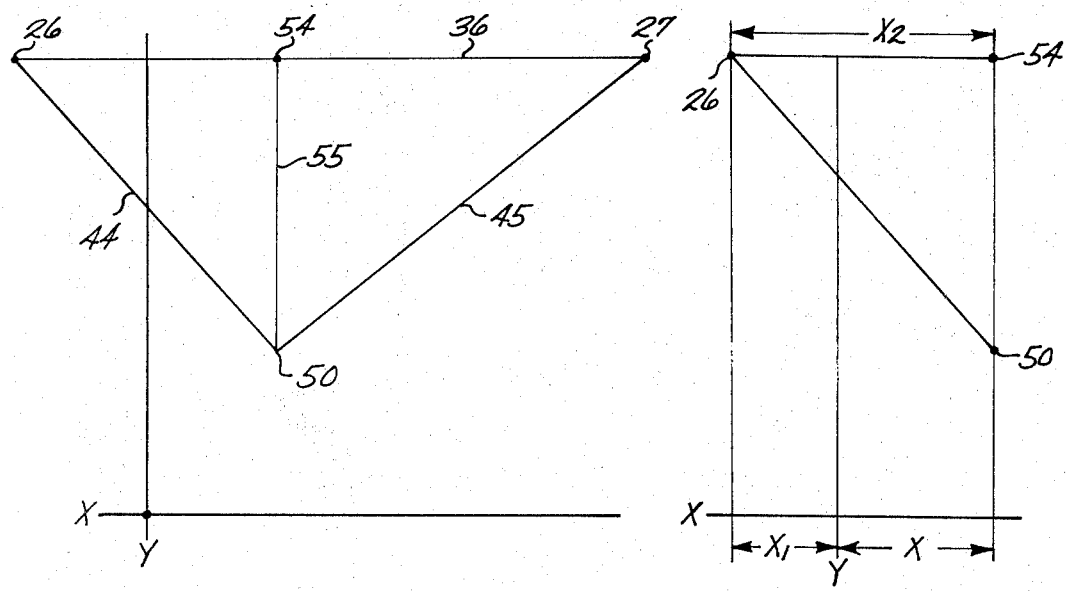
FIG. 6 is a diagram illustrating calculations made in conjunction with a first embodiment of the present invention.
FIG. 7 is a diagram illustrating further calculations made in conjunction with a first embodiment of the present invention.

Referring to FIG. 6, a scalene triangle 26, 27 and 50 is shown, which is the imaginary triangle described above. The arbitrary X and Y axes are also shown. In this X–Y plane, it can be seen that the value of Y at point 50 is equal to the value of Y at point 54, which is known, minus the length of line 55. The Y value of point 54 is known because the X axis may be chosen an arbitrary distance from the fixed location of the sensors, which are points 26 and 27 in the triangle.

SInce the distance between the sensors (line 36) is fixed and known and since angles 42 and 43 have been measured, as explained above, the length of line 55 may be calculated according to the formula:

$Y_1 =$ (length of line 55) = distance between sensors 26 and 27/(COT of angle 42 + COT angle 43)

The cotangent values can be looked up in a standard table, typically by a computer and the length of line 55 easily calculated. The Y value of point 50 may then be calculated by subtracting the calculated length of line 55 from the known Y value of point 54.

Referring to FIG. 7, the value of X in the X–Y plane, may be determined by considering the triangle 26, 54, 50, which is again derived from FIG. 5. It is equal to $X_2 - x_1$. The value of $X_1$ is known, depending on the location of the Y axis. The distance $X_2$ between point 26 and point 54 must then be calculated. Again, from principles of plane trigonometry, $X_2$ is determined according to the following formula: $X_2 = Y_1$ (COT of angle 42). Since both $Y_1$ and the cotangent of angle 42 are known from previous calculations, the value of $X_2$ may be calculated without the need of tables. The X value of point 50 may then be determined by subtracting $X_1$ from $X_2$. Subsequent measurements of X and Y at succeeding planes along the longitudinal axis of the log may be made, all with respect to the same arbitrary X–Y axis, and then compared, to determine the true center line of a log. Furthermore, the centerline measurement may be compared with a reference line at various longitudinal locations to determine the sweep at those locations. The log's diameter may also be easily calculated by known triangulation methods at those locations.

Figure 8:
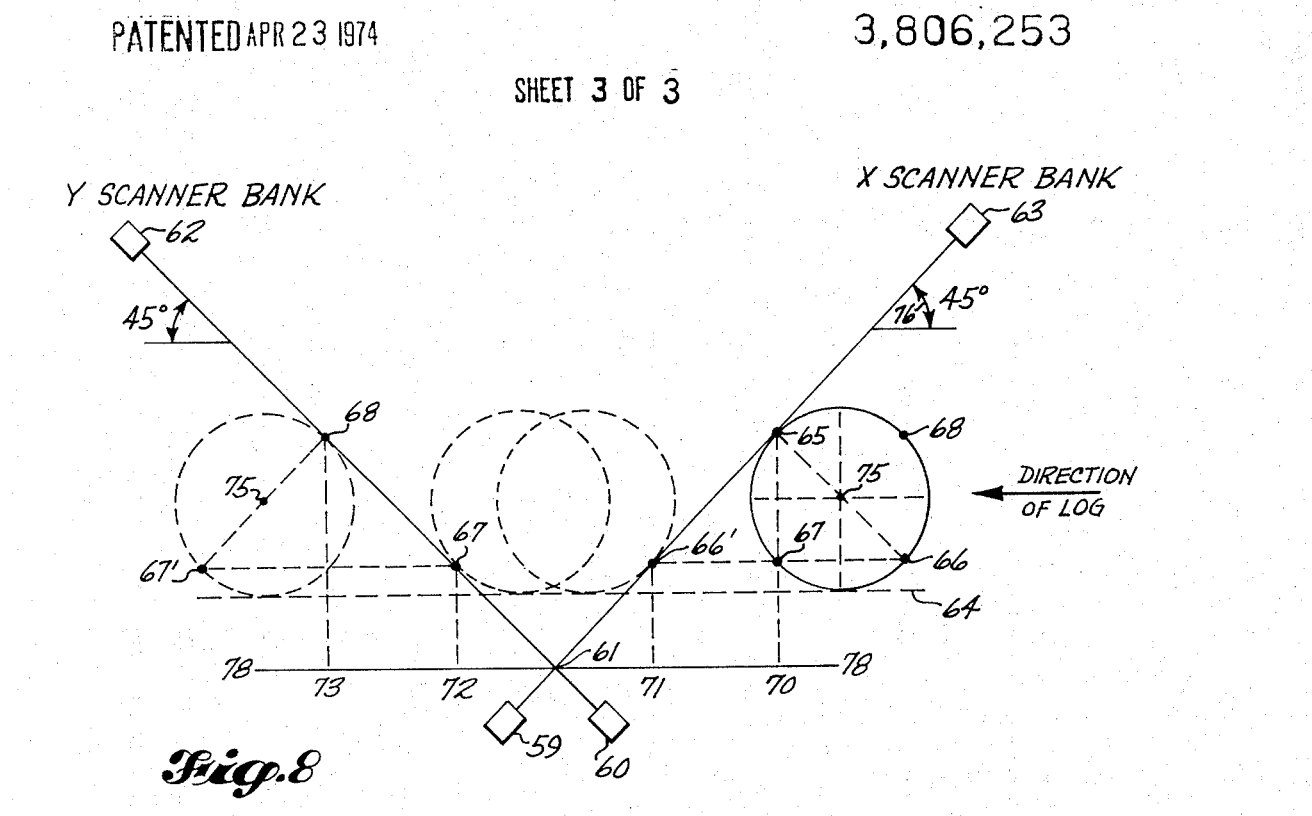

FIG. 8 shows a second embodiment of the invention wherein a log moves transversely from right to left, alternately "breaking" and making the light beams which originate from sources 59 and 60. These beams intersect at a point 61 and are individually received by two standard light sensors 62 and 63, each sensor, for purposes of illustration, being placed 45° from the horizontal. As the log moves via the conveyor 64, the log will first break the light beam from source 59 at point 65 on the log. As the log continues to move, the light beam from sensor 59 to sensor 63 will remain interrupted, until log point 66, which is the last point on the log to interrupt light beam 59, moves out of the line of sight between sensor 63 and light source 59.

In this embodiment, the system is configured so that light beam 59 is re-established before the beam from source 60 is interrupted, although this configuration is not necessary for proper operation. The log will continue to move on the conveyor belt, next interrupting or breaking the light beam of source 60 at point 67 on the log. The beam will remain interrupted or broken until the last point on the log 68 moves out of the line-of-sight between source 60 and sensor 62, thereby re-establishing that light beam. The distance that the log moves between the various interrupting and re-establishing points is accumulated by a standard counter mechanism as the conveyor and the log move.

The light sources and their associated sensors are located at successive preselected plane positions along the longitudinal axis of the log. FIG. 8 shows an end view of the log and the first plane of light sources with their associated sensors. Additional planes of light sources and sensors are located at regular intervals along the longitudinal axis of the log. The entire log is thus measured by a plurality of light sources and sensors as the log moves laterally on the conveyor.

The centerline of the log is determined with respect to each longitudinal bank of scanners, each scanner comprising a single light source and its associated sensor. By determining a coordinate of the center point of the log with respect to each bank of scanners, at every scanner position, the log centerline is fully defined at each longitudinal scanner position.

The X and Y coordinates, with respect to the X and Y scanner banks, respectively, may be obtained by calculating the diameter of the log at two positions. The accuracy of these coordinate measurements depends upon the log remaining stable with respect to the conveyor during its travel through the scanner banks. During the time that a log moves through the two banks of scanners, its longitudinal axis must remain approximately parallel to the two scanner banks and must not have rolled or moved on the conveyor itself.

A first diameter measurement relative to the X scanner bank is obtained by measuring or accumulating the distance which the log travels from the time that point 65 on the log first interrupts the beam, until the time that point 66 on the log re-establishes the beam. As can be seen from FIG. 8, this known distance, 66-66', is one side of a right triangle of which an adjacent side is the diameter of the log. This triangle will always be a right triangle, since a line drawn perpendicular to the light beam at the point of first interception will always fall through the center of a cylindrical log. The diameter 65-66 of the log can be easily calculated because the angle 76 is known. In this case, the diameter 65-66 is calculated as follows:

Diameter = (distance 66-66') (Sin 45°)

As can be seen from inspection of FIG. 8, the coordinate of center point 75, relative to the X scanner bank plane, will be equal to one-half of the diameter for this first scanner position.

The diameter is obtained in a similar fashion at each of the other X scanners located along the longitudinal axis of the log. The determination of the X coordinate, however, requires an additional calculation. Assuming, for illustration, that the log is oriented such that the near end of the log makes the first interception with the X scanner bank, an additional measurement is made to determine, at each successive X scanner position, the distance which the log traveled from the first interception at the near end to the first interception at each of the successive X scanner positions. Each of these distances is then added to the calculation of one-half of the diameter at the respective X positions to determine the X coordinate of the log at each of the successive X scanner positions.

The diameter of the log and its coordinate with respect to the Y bank of scanners is determined in an identical fashion, assuming, as noted above, that the log does not roll during its travel down the conveyor. The calculation of the log diameter relative to the Y scanner bank utilizes point 67 on the log, which first interrupts the beam source 60, and point 68, which last interrupts the beam 60. The diameter measurement 68-67' can be obtained, and by dividing the measurement in half, the distance 68-75 can be also obtained, which will be the Y coordinate of the log centerline with respect to the Y scanner position shown in FIG. 8.

Sweep detection of an object such as, but not necessarily, a log utilizing two sensors may, of course, be accomplished by many variations of the system described above; for instance, a system similar to that utilized for the longitudinal embodiment may also be utilized in the transverse direction, by positioning banks of lights and photo diodes in planes along the entire longitudinal axis of the object to be measured. Additionally, the sensing system may be moved relative to the log, rather than the log relative to the sensors.

Although exemplary embodiments of the invention have been disclosed herein for purposes of illustration, it will be understood that various changes, modifications, and substitutions may be incorporated in such embodiments without departing from the spirit of the invention as defined by the claims which follow:

What is claimed is:

1. A method for determining the sweep of an elongated object comprising the steps of: measuring a geometric center point of an elongated object at a first specified location along the longitudinal axis of said elongated object relative to a first fixed three-dimensional reference axis, which reference axis substantially parallels the longitudinal direction of said object; measuring a geometric center point of said elongated object at a second specified location along said longitudinal axis relative to said fixed reference axis; and comparing said first and second measurements, a difference between said first and second measurements being indicative of the sweep of said elongated object at said second location, relative to said first location.

2. The method according to claim 1, including the step of measuring a geometric center point of said elongated object at more than two specified locations in the longitudinal direction of said elongated object, each of said measurements being made with respect to said fixed reference axis, said measurements being made in a plane normal to said longitudinal direction of said elongated object at each specified location.

3. The method according to claim 2 wherein the steps of measuring include detecting two opposing edges of said elongated object relative to each of at least two reference points removed from the surface of said elongated object, said reference points being angularly removed from one another and lying substantially in said plane normal to said longitudinal direction of said elongated object at each said specified location.

4. The method according to claim 3 wherein the step of measuring includes actuating at least two light sensitive detectors located at said reference points, output signals of each of said detectors being dependent upon the outside dimensions of said elongated object with respect to each of said detectors.

5. The method according to claim 4 wherein said elongated object is a log, substantially round in cross section.

6. The method according to claim 5 wherein said measurements are made at successive intervals of no more than four feet along the longitudinal axis of the log.

7. A method in accordance with claim 6 wherein the step of comparing includes comparing each of said measurements at said specified locations with said measurement at said first specified location.

8. The method according to claim 1 wherein the steps of measuring include positioning a plurality of sensors around an elongated object, each of said plurality of sensors being located substantially in a plane normal to the longitudinal direction of said elongated object, at each said specified location, each sensor being actuated so as to provide output signals related to the location of a plurality of center lines through said geometric center of said elongated object in said plane from each of said sensors, the intersection of said plurality of center lines indicating the geometric centerpoint of said elongated object in said first plane.

9. The method according to claim 8 wherein the steps of measuring include determining a first angle relative to a first sensor of said plurality of sensors, said first angle extending from a connecting line connecting said first sensor and a second sensor to a first center line associated with said first sensor, said first center line passing through a point equidistant from the two opposite edges of said elongated object visible to said first sensor, said first angle indicative of the location of said first center line associated with said first sensor.

10. The method according to claim 9 wherein the steps of measuring further include determining a second angle relative to a second sensor of said plurality of sensors, said second angle extending from said connecting line to a second center line associated with said second sensor, said second center line passing through a point equidistant from the two opposite edges of said elongated object visible to said second sensor, said second angle indicative of the location of said center line associated with said second sensor passing through said geometric center of said elongated object in said plane, and determining the intersection of said center lines associated with said first and second sensor, said intersection occurring at a point within said elongated object, representing the geometric centerpoint of said elongated object in said first plane.

11. The method according to claim 10 wherein said plurality of sensors is actuated by light which is reflected from said elongated object.

12. The method according to claim 1 wherein the steps of measuring include positioning at least two light sensitive detectors at a distance from said elongated object, said detectors being receptive to light from at least one light source, and moving said elongated object and said detectors in relation to one another such that said elongated object passes between said light source and each of said detectors.

13. The method according to claim 12 including the step of determining a lateral distance traveled by said elongated object, as said elongated object passes between said elongated light source and said elongated object during a period wherein light is blocked from a specified photo detector by said elongated object.

* * * * *

UNITED STATES PATENT OFFICE
CERTIFICATE OF CORRECTION

Patent No. 3,806,253         Dated April 23, 1974

Inventor(s) Eric B. Denton

It is certified that error appears in the above-identified patent and that said Letters Patent are hereby corrected as shown below:

Column 10, line 34, between the words "said" and "light" delete the first use of the word "elongated".

Signed and sealed this 1st day of October 1974.

(SEAL)
Attest:

McCOY M. GIBSON JR.
Attesting Officer

C. MARSHALL DANN
Commissioner of Patents